United States Patent
Chapman

(10) Patent No.: US 6,513,769 B1
(45) Date of Patent: Feb. 4, 2003

(54) VIBRATION DAMPENING STEERING RING FOR CAMERA PEDESTAL

(76) Inventor: Leonard T. Chapman, 12950 Raymer St., North Hollywood, CA (US) 91605

( * ) Notice: Subject to any disclaimer, the term of this patent is extended or adjusted under 35 U.S.C. 154(b) by 0 days.

(21) Appl. No.: 09/706,103

(22) Filed: Nov. 3, 2000

(51) Int. Cl.$^7$ .................................................. A47F 5/00
(52) U.S. Cl. .................................... 248/125.1; 248/632
(58) Field of Search ............................. 248/125.1, 631, 248/669, 689, 177.1, 187.1, 603, 632, 635; 352/243; 396/428, 419, 425

(56) References Cited

U.S. PATENT DOCUMENTS

| | | | | |
|---|---|---|---|---|
| 4,657,267 A | * | 4/1987 | Jaumann | 280/47.11 |
| D315,817 S | * | 3/1991 | Healy | D34/23 |
| D347,501 S | * | 5/1994 | Chapman | D16/242 |
| 5,318,313 A | * | 6/1994 | Chapman | 280/47.11 |
| D361,587 S | * | 8/1995 | Chapman | D16/242 |
| 5,820,088 A | | 10/1998 | Chapman | |
| 6,068,224 A | * | 5/2000 | Horiuchi | 248/187.1 |

OTHER PUBLICATIONS

The *Pedolly* Brochure, Leonard Studio Equipment, 1994, 6 pages.

* cited by examiner

Primary Examiner—Korie Chan
Assistant Examiner—Gwendolyn Baxter
(74) Attorney, Agent, or Firm—Perkins Coie LLP

(57) ABSTRACT

A camera pedestal having a vibration dampening steering ring. The steering ring is vibrationally isolated from most vibrations caused by the mechanisms of the camera pedestal. The spokes of the steering ring have vertical flex to further dampen vibrations. The steering ring is covered with a vibration dampening cover to further dampen vibrations.

15 Claims, 4 Drawing Sheets

VIBRATION DAMPENING STEERING RING FOR CAMERA PEDESTAL

BACKGROUND OF THE INVENTION

The field of the present invention relates to pedestals for video, television, and motion picture cameras.

Video, television, and motion picture cameras must often be positioned in a particular way for a video or film sequence. The camera must also often move or sweep in azimuth or elevation, and the entire camera may need to be translated or moved over the ground surface, e.g., to follow an action sequence or obtain a desired cinematographic effect.

Generally, all movement of the camera must be uniform and smooth without any bumping, rocking, tilting, vibration or other movement that will cause the recorded images to jump when viewed on a screen. Mobile camera pedestals are commonly used to obtain such a wide range of movement. Typically, camera pedestals have a triangular base with a wheel or wheel pair at each of the three corners of the base. Some camera pedestals, for example as described in U.S. Pat. Nos. 5,820,088; 5,318,313; 5,410,684; and 5,516,070 incorporated herein by reference, have a rectangular base with 4 wheels or wheel pairs and allow the camera to be raised, lowered, turned, swept (in azimuth), tilted, or elevated.

Ideally, the camera pedestal should support and move the camera with an absolute minimum of noise, vibration, rocking, tilting, jarring, etc. However, reaching these objectives can present difficult engineering challenges. For many of the camera pedestal's functions, even precision machining can not completely eliminate vibrations caused by internal mechanisms. Additional vibrations are also frequently caused by the camera pedestal moving over an uneven surface. To reduce or eliminate the unwanted effects vibrations cause to the recorded images, cameras are often mounted on the pedestal using a separate vibration dampening device.

The goal of obtaining the smoothest image possible, however, is not completely met by isolating the camera from vibrations. The same vibrations that effect the operation of the camera can also effect the person operating the pedestal, e.g., a camera operator or videographer, cinematographer, dolly grip, etc. Smooth changes in camera position during a filming sequence are dependent upon the pedestal operator's skills and steady hands. The pedestal operator uses the different mechanisms provided by the camera pedestal to change camera positions. For example, in translating or moving the camera pedestal over the ground, the pedestal operator pushes and steers the camera pedestal using a steering ring which is typically mounted just below the camera at the top of the pedestal.

In current camera pedestal designs, such as in U.S. Pat. No. 5,820,088, the steering ring is rigidly attached to the camera pedestal. Through this rigid connection, vibrations from the entire camera pedestal are easily transmitted through the steering ring and into the hands of the pedestal operator as the camera is guided through its movements. The rigidly attached steering ring can have the effect of actually amplifying vibrations from the camera pedestal. In addition, any vibrations or impact on the ring can be transmitted through the pedestal to the camera.

Accordingly, it is an object of the invention to provide an improved steering ring for a camera pedestal which reduces shock and vibrations.

SUMMARY OF THE INVENTION

In a first aspect of the invention, a steering ring for a camera pedestal is mechanically isolated from the body of the camera pedestal. Preferably, the steering ring is supported on the pedestal via vibration absorbing or blocking materials, such as elastomers. Vibration and shock to and from the steering ring is reduced. This improves the feel of the steering ring in the pedestal operator's hands, and also tends to reduce vibration transmitted from the steering ring to the camera lens.

In a second aspect of the invention, the steering ring is attached to the pedestal body via spring elements. The spring elements preferably allow for vertical flexing of the steering ring, reducing vibration to and from the steering ring.

DETAILED DESCRIPTION OF THE PREFERRED EMBODIMENTS

Figure 1:
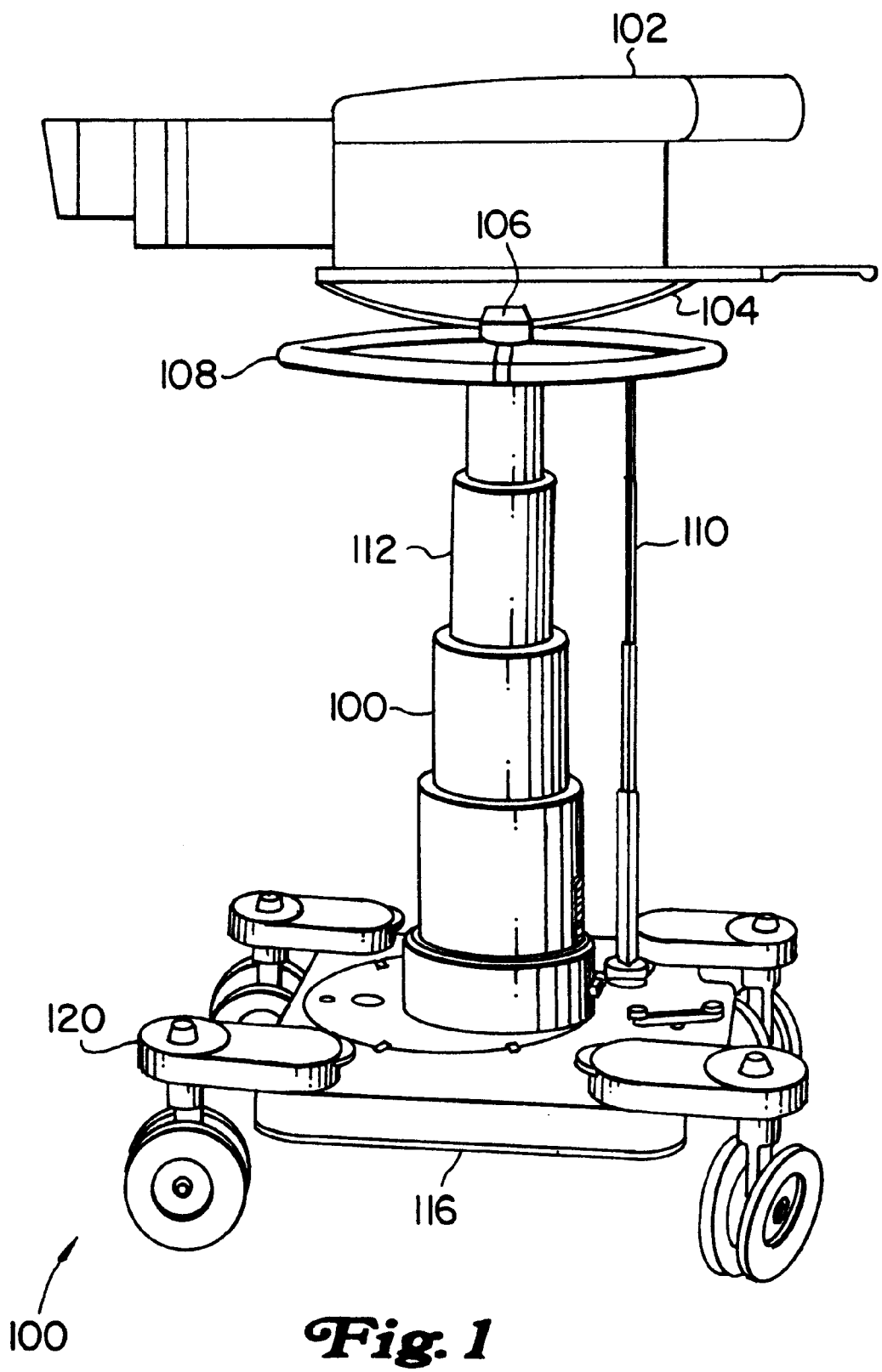
FIG. 1 is a perspective view of a camera pedestal in a raised position.
Figure 2:
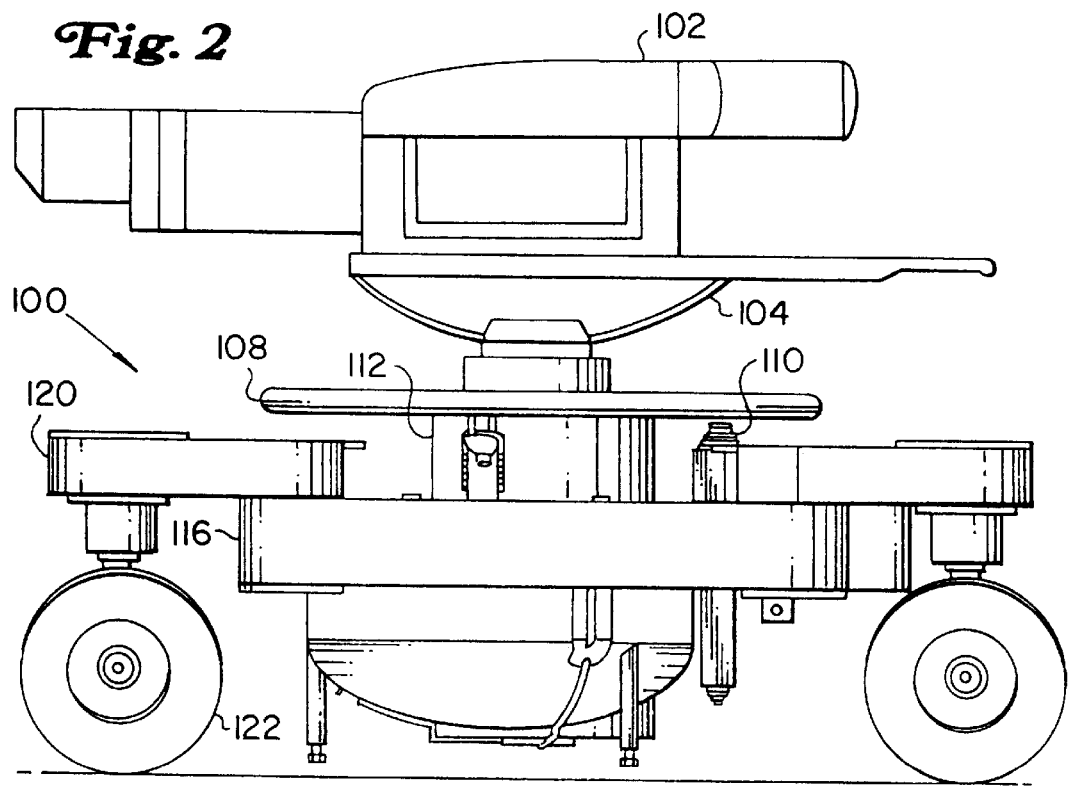
FIG. 2 is a side view of the pedestal of FIG. 1 in a lowered position.
Figure 3:
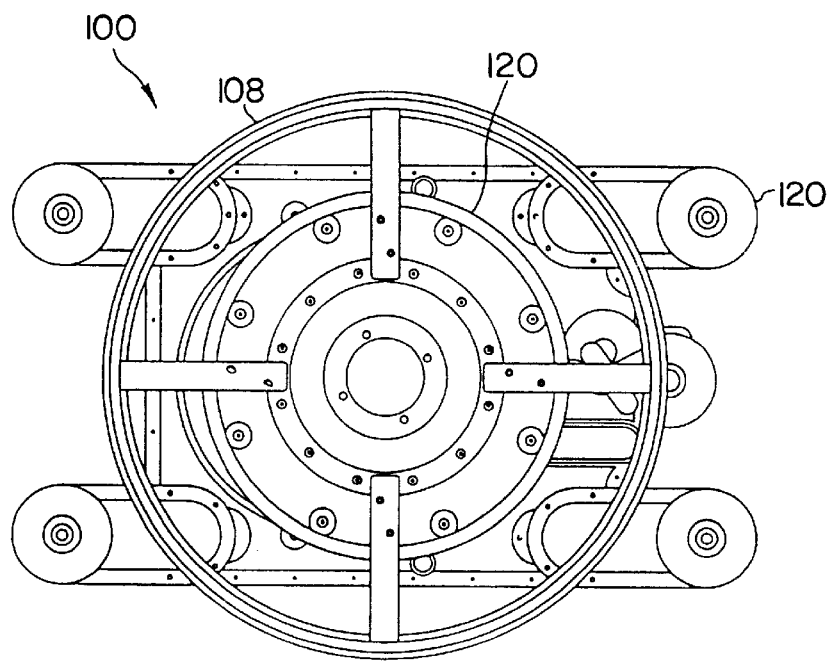
FIG. 3 is a top view of the camera pedestal shown in FIGS. 1 and 2.

Turning in detail to the drawings, FIG. 1 illustrates a camera pedestal 100 having a video, television, or motion picture camera 102 optionally mounted on a tilt head 104 which in turn is mounted on a top plate 106 of the camera pedestal 100. A steering ring 108 is linked to a telescoping steering drive tube 110 extending into a steering system in a dolly base 116. A column assembly 112, shown in the raised position in FIG. 1, extends and retracts to raise and lower the camera. FIG. 2 illustrates the camera pedestal 100 with the column assembly 112 in the lowered position. The pedestal 100 is mounted on a dolly 116 having four articulating legs 120. Wheels 122 are attached to the legs 120 and roll on the floor or ground surface or on track rails. These features are described in the U.S. Patents referred to above. FIG. 3 illustrates a top view of the camera pedestal 100 without a camera 102.

Figure 4:
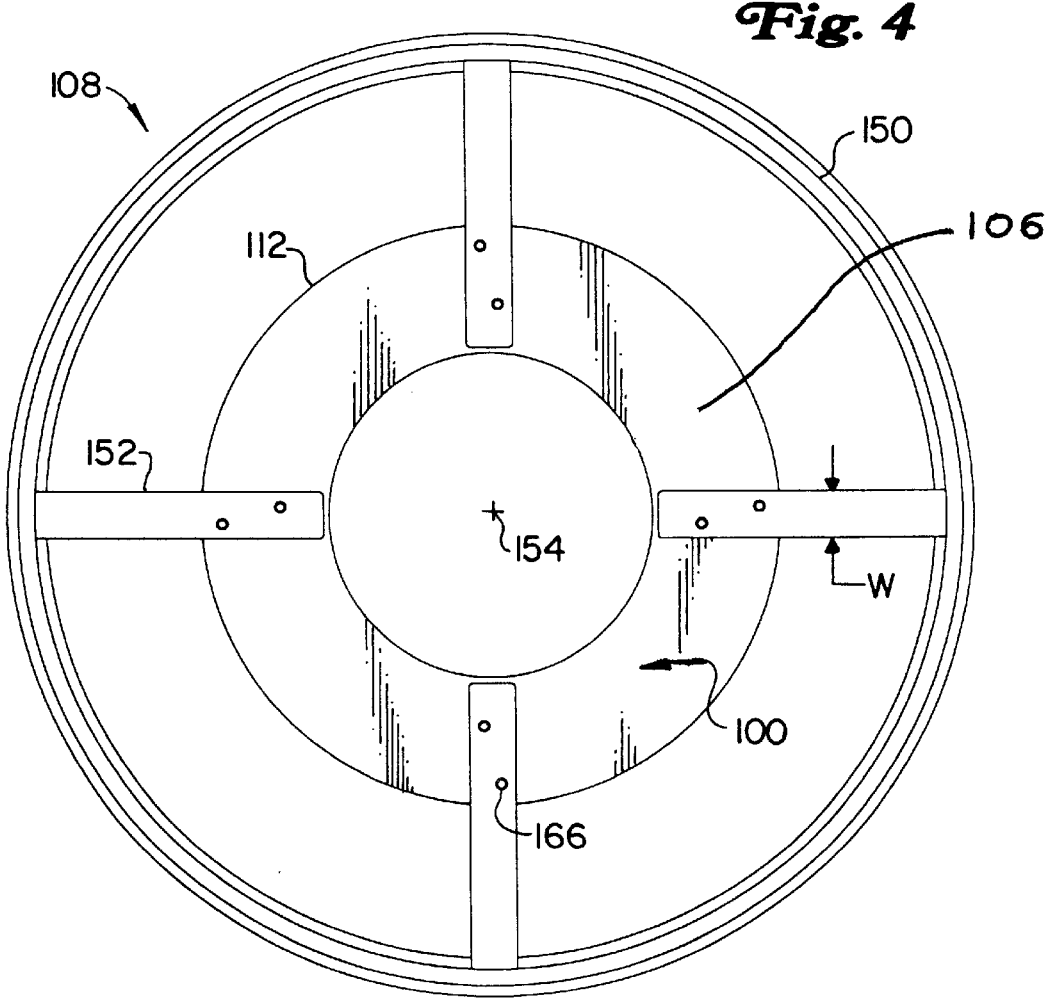
FIG. 4 is a detailed view of the steering ring of FIG. 3.

FIG. 4 illustrates a preferred embodiment of the steering ring 108 comprising an outer ring 150 and preferably three or four spokes 152 attached to the outer ring 150. More spokes may be used, but having more spokes tends to interfere with the operators handling on the ring. The outer ring 150 is preferably toroidal in shape and constructed of a steel bar or rod that is approximately ¼" to 1" or ⅜" to ⅝", in diameter, and preferably about ½" (1.27 cm) in diameter. These diameters preferably provide an outside ring diameter of from ¾–1¼" or ⅞"–1⅛" and preferably 1"–1⅛" diameter, after the bar is covered with foam padding and a cover layer. Alternative embodiments of the material, (e.g., aluminum) size, and shape of the outer ring may of course be substituted to better meet the requirements of the operator. The spokes 152 are preferably spaced evenly apart radially around the outer ring 150 and extend directly towards the center 154 of the top plate 106. Preferably, the spokes 152 are constructed of steel and may be of a unitary construction with the outer ring 150.

Figure 5:
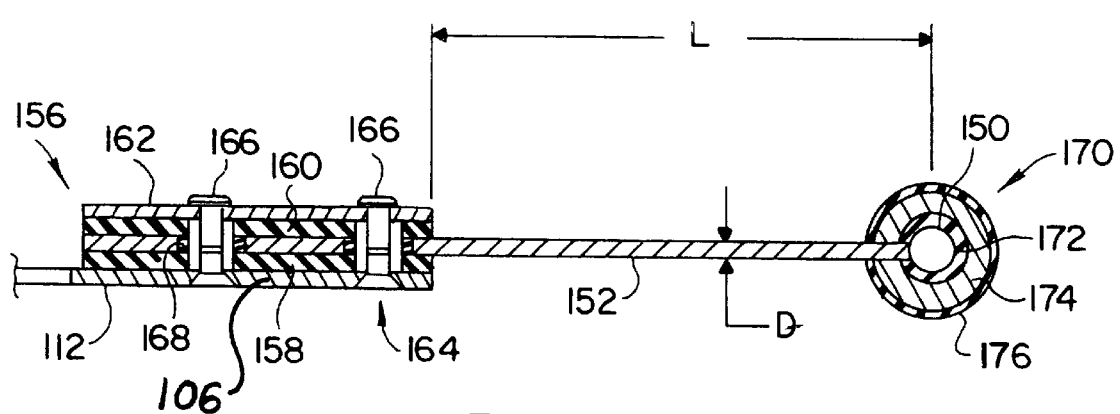
FIG. 5 is a partial sectional view of the steering ring of FIG. 3.

The spokes 152 of the steering ring 108 are preferably attached to the top plate 106 with fasteners 166. As illustrated in FIG. 5, each spoke 152 is vibrationally isolated from the top plate 106 and the column assembly 112 using a multi-layer sandwich assembly 156 which is formed from the bottom up by: (a) the top plate 106; (b) a first layer 158 of a vibration dampening material, preferably a polyurethane material including but not limited to open cell polyurethane or Sorbothane™ foam; (c) a spoke 152; (d) a second layer 160 preferably of the same vibration dampening material used for the first layer 158; and (e) a rigid plate 162, preferably constructed from a rigid metal such as aluminum or steel. Holes 164 pass through each layer of the sandwich assembly 156 with fasteners 166 extending through the holes to hold and partially clamp the sandwich assembly 156 together. The holes 164 in the spoke 152 are lined with a lining 168, preferably constructed of the same vibration dampening material used for the first and second layers 158, 160, so that the fasteners 166 do not come into direct contact with the spoke 152.

In addition to isolating the steering ring to minimize the vibrations it receives or transmits, each spoke 152 is constructed to provide a small amount of vertical flex to further dampen vibrations. The vertical flex is created by constructing the spokes 152 with a narrow vertical dimension D in FIG. 5, preferably approximately 1/32" or 1/16", 1/4" or 1/8–5/16", and more preferably about 3/16", depending on the width W, as shown in FIG. 4. The width W in FIG. 4 is preferably 1"–2" inches, preferably 1½", for a steel spoke of 1/8–1/4", and preferably 3/16 inch thick. The length L is preferably 3–7 or 4–6 inches, preferably about 5 inches. This provides a spring constant preferably ranging from 50–200 lbs/inch. However, it is desirable for the spokes 152 to retain rigidity in the horizontal direction so that the steering ring 108 can properly perform its primary purpose of steering the camera pedestal 100.

The camera pedestal operator is further isolated from any vibrations by covering the outer ring 150 with a vibration dampening cover 170. This vibration dampening cover 170 is preferably formed by three layers of materials 172, 174, 176. The first layer 172 is preferably a relatively thin tube constructed of a vibration dampening material, preferably rubber approximately 1/32" to 1/8" thick, and more preferably 1/16" (1.59 cm) thick. The second layer 174 preferably acts as a cushion for the steering ring 108 and is preferably the primary vibration dampener out of the three layers 172, 174, 176. This second layer 174 preferably comprises the same vibration dampening material used to vibrationally isolate the steering ring 108 from the column assembly 112 and is preferably approximately 3/16" to 3/4" thick, and more preferably about 3/8" (3.17 cm) or 5/16" thick. The outer layer 176 is preferably constructed from a durable protective material, preferably leather. This outer layer 176 protects the first layer 172 and the second layer 174 from damage and functions as a grip for the camera pedestal operator. The overall diameter of the grip for the steering ring 108, including the outer ring 150 and the three layers 172, 174, 176, is preferably ranges from ½" to 2", and more preferably about ¾" to 1½" or 1" (2.54 cm).

Figure 6:
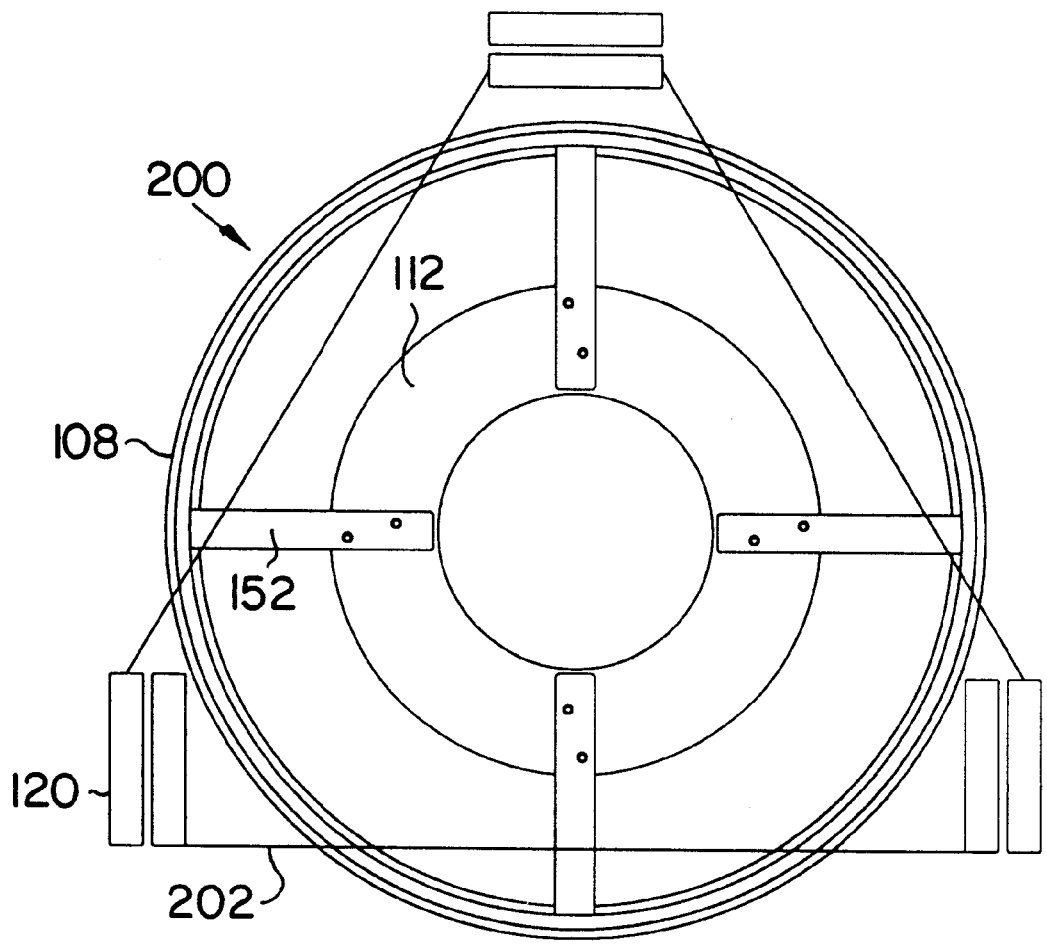
FIG. 6 is a top view of a camera pedestal having a triangular base with three wheel pairs, and having the steering ring shown in FIG. 4.

A shown in FIG. 6, the steering ring 108 may also be used on a camera pedestal 200 having a triangular base 202 and three wheel pairs.

Thus, a vibration dampening steering ring for a camera pedestal is disclosed. While embodiments of this invention have been shown and described, it would be apparent to those skilled in the art that many more modifications are possible without departing from the inventive concepts herein. The invention, therefore, is not to be restricted except to the following claims and their equivalents.

What is claimed is:

1. A camera pedestal comprising:
   a column;
   a sandwich assembly on the column, with the sandwich assembly including first and second layers of a vibration dampening material;
   a spoke secured between the first and second layers of the vibration dampening material of the sandwich assembly and extending outwardly from the column; and
   a steering ring attached to the spoke.

2. The camera pedestal of claim 1 with the steering ring having at least one layer of the vibration dampening material thereon, and a cover layer over the at least one layer of the vibration dampening material.

3. The camera pedestal of claim 1 wherein the spoke is flexible.

4. A camera pedestal comprising:
   a column;
   a plurality of sandwich assemblies on the column, with each sandwich assembly including first and second layers of a vibration dampening material;
   a plurality of spokes, with one spoke secured between the first and second layers of the vibration dampening material of each of the sandwich assemblies and with each of the spokes extending radially outwardly from the column; and
   a steering ring attached to each of the spokes.

5. The camera pedestal of claim 4 with the steering ring having at least one layer of a vibration dampening material thereon, and a cover layer over the at least one layer of vibration dampening material.

6. The camera pedestal of claim 4 wherein the spokes are flexible in a vertical direction.

7. A camera pedestal having a telescoping column assembly supported on a dolly base, and a steering system in the dolly base, comprising:
   a steering ring linked to a steering system in the dolly base, the steering ring having an outer ring and a plurality of flexible spokes extending radially inwardly from the steering ring to the column assembly;
   a vibration dampening cover on the outer ring including a first layer of a first vibration dampening material, a second layer of a second vibration dampening material, and an outer layer of a protective material.

8. In a camera pedestal having a steering ring attached to a telescoping column assembly supported on a dolly base, and with the steering ring linked to a steering system in the dolly base, the improvement comprising:
   the steering ring having an outer ring and a plurality of flexible spokes connecting the steering ring to a sandwich structure on the column assembly, with the sandwich structure having a first layer of a vibration dampening material on the column assembly, one of the plurality of spokes on the first layer, a second layer of vibration dampening material on the spoke, and a rigid plate on the second layer.

9. In a camera pedestal having a steering ring attached to a telescoping column assembly supported on a dolly base, and with the steering ring linked to a steering system in the dolly base, the improvement comprising:
   the steering ring having an outer ring and a plurality of flexible spokes connecting to a sandwich structure on the column, and with the sandwich structure secured using fasteners passing through holes in the sandwich structure, with the holes lined with a vibration dampening material.

10. A camera pedestal having a column assembly and a steering ring with a plurality of spokes, each spoke connected to and vibrationally isolated from the column assembly by a sandwich structure having a first layer of a vibration dampening material on the column assembly, one of the plurality of spokes on the first layer of the vibration dampening material, a second layer of a vibration dampening material on the spoke, and a rigid plate.

11. In a camera pedestal having a steering ring attached to a telescoping column assembly supported on a dolly base, and with the steering ring linked to a steering system in the dolly base, the improvement comprising:

the steering ring having an outer ring and a plurality of flexible spokes connecting the steering ring to the column assembly; and a vibration dampening cover on the outer ring comprising:
a first layer constructed of a first vibration dampening material;
a second layer constructed of a second vibration dampening material; and
an outer layer constructed of a protective material.

12. In a camera pedestal having a steering ring attached to a telescoping column assembly supported on a dolly base, and with the steering ring linked to a steering system in the dolly base, the improvement comprising:

the steering ring having an outer ring and a plurality of flexible spokes connecting the steering ring to the column assembly;

wherein the plurality of flexible spokes are connected to the column assembly using a sandwich structure comprising the layers of: (a) the column assembly, (b) a vibration dampening material, (c) one of the plurality of spokes, (d) the vibration dampening material, and (e) a rigid plate.

13. In a camera pedestal having a steering ring attached to a telescoping column assembly supported on a dolly base, and with the steering ring linked to a steering system in the dolly base, the improvement comprising:

the steering ring having an outer ring and a plurality of flexible spokes connecting the steering ring to the column assembly;

wherein the plurality of flexible spokes are connected to the column assembly using a sandwich structure, the sandwich structure secured using fasteners passing through holes in the sandwich structure, said holes lined with a vibration dampening material.

14. A camera pedestal, comprising:

a column assembly and a steering ring with a plurality of spokes, each spoke connected to and vibrationally isolated from the column assembly by a sandwich structure;

wherein the sandwich structure comprises the layers of (a) the column assembly, (b) a vibration dampening material, (c) one of the plurality of spokes, (d) the vibration dampening material, and (e) a rigid plate.

15. A camera pedestal having a column assembly and a steering ring with a plurality of spokes, each spoke connected to and vibrationally isolated from the column assembly by a sandwich structure;

wherein the sandwich structure is secured using fasteners passing through holes in the sandwich structure, said holes being lined with a vibration dampening material.

* * * * *